United States Patent
McGee et al.

(10) Patent No.: US 9,227,630 B2
(45) Date of Patent: Jan. 5, 2016

(54) SMOOTHING HYBRID VEHICLE ENGINE SHUTDOWN

(71) Applicant: FORD GLOBAL TECHNOLOGIES, LLC, Dearborn, MI (US)

(72) Inventors: Ryan A. McGee, Ann Arbor, MI (US); Rajit Johri, Ann Arbor, MI (US); Wei Liang, Farmington Hills, MI (US); Mark S. Yamazaki, Canton, MI (US); Xiaoyong Wang, Novi, MI (US); Ming L. Kuang, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 215 days.

(21) Appl. No.: 14/181,905

(22) Filed: Feb. 17, 2014

(65) Prior Publication Data

US 2015/0232086 A1    Aug. 20, 2015

(51) Int. Cl.
*B60W 10/02*    (2006.01)
*B60W 20/00*    (2006.01)
*B60W 10/06*    (2006.01)
*B60W 10/08*    (2006.01)
*B60W 30/20*    (2006.01)

(52) U.S. Cl.
CPC ............... *B60W 20/40* (2013.01); *B60W 10/02* (2013.01); *B60W 10/06* (2013.01); *B60W 10/08* (2013.01); *B60W 30/20* (2013.01); *B60W 2030/206* (2013.01); *Y10S 903/93* (2013.01); *Y10T 477/26* (2015.01)

(58) Field of Classification Search
CPC ..... B60W 20/40; B60W 10/02; B60W 10/08; B60W 10/06; B60W 30/20; B60W 2030/206; Y10T 477/26; Y10S 903/93

See application file for complete search history.

(56) References Cited

U.S. PATENT DOCUMENTS

| | | | | |
|---|---|---|---|---|
| 6,335,573 B1* | 1/2002 | Eguchi | ................... | B60K 6/485 290/40 C |
| 6,352,489 B1* | 3/2002 | Kuroda | ................... | B60K 6/48 180/65.25 |
| 6,434,453 B1 | 8/2002 | Kuroda et al. | | |
| 7,463,968 B2 | 12/2008 | Snyder | | |
| 7,617,896 B2* | 11/2009 | Ogata | ...................... | B60K 6/48 180/292 |
| 8,452,469 B2 | 5/2013 | Otokawa | | |
| 9,175,632 B2* | 11/2015 | Hirotsu | ................. | B60W 10/02 |
| 2003/0171867 A1* | 9/2003 | Nakamori | ............. | B60W 10/30 701/54 |
| 2008/0058154 A1* | 3/2008 | Ashizawa | ................ | B60K 6/36 477/5 |
| 2008/0071437 A1* | 3/2008 | Hirata | ...................... | B60K 6/48 701/22 |
| 2015/0217751 A1* | 8/2015 | Reed | .................... | B60W 10/02 701/67 |

* cited by examiner

*Primary Examiner* — David J Hlavka
(74) *Attorney, Agent, or Firm* — David B. Kelley; MacMillan, Sobanski & Todd, LLC

(57) ABSTRACT

A method of smoothing hybrid vehicle engine shutdown. A powered and rotating electric machine is used to slow deceleration of an unpowered and rotating engine by transferring torque through a clutch from the machine to the unpowered engine. Prior to the machine being powered, torque may be transferred through the clutch from the unpowered and rotating engine to the unpowered machine to accelerate passage of the engine through a resonance frequency.

20 Claims, 4 Drawing Sheets

SMOOTHING HYBRID VEHICLE ENGINE SHUTDOWN

BACKGROUND OF INVENTION

The present invention relates to a method of controlling an automotive engine and in particular to a method of smoothing engine shutdown.

Some automotive vehicle powertrains incorporate engine start/stop (ESS) systems to improve fuel economy. ESS shuts down an internal combustion engine under specified conditions when engine torque is not required and restarts the engine when torque is again required. For example, ESS may shutdown the engine of a vehicle after a driver brakes the vehicle to a stop and then restart the engine when the driver requests torque by depressing an accelerator pedal. ESS is commonly incorporated into hybrid electric powertrains. In general, the more conditions specified when ESS will shutdown the vehicle engine, the greater the improvement to fuel economy.

However, noise, vibration, and harshness may result from the engine shutdown as an engine speed falls through a resonance frequency of the engine. Harshness may also result from energy being transferred, as the engine speed decreases, through the engine mounts to the vehicle.

SUMMARY OF INVENTION

An embodiment contemplates a method of smoothing hybrid vehicle engine shutdown. An engine is powered and an electric machine is rotating while a clutch between the engine and machine is disengaged. The engine is unpowered while the machine remains rotating with the clutch disengaged. Deceleration of the unpowered engine is controlled by controlling the clutch to transfer torque from the rotating machine to the unpowered engine and decreasing rotation of the machine.

Another embodiment contemplates a method of smoothing hybrid vehicle engine shutdown. An engine is powered and rotating while a clutch between the engine and an unpowered and non-rotating electric machine is disengaged. While the engine is powered and rotating, and the machine unpowered and non-rotating, the engine is unpowered. The unpowered and non-rotating machine is then rotated by controlling the clutch to transfer torque from the unpowered and rotating engine to the machine. The rotating machine is powered when rotation of the engine and machine are each non-zero and within a predetermined speed range. Deceleration of the unpowered engine is controlled by decreasing rotation of the powered and rotating machine and controlling the clutch to transfer torque from the powered and rotating machine to the unpowered engine.

Another embodiment contemplates a method of smoothing hybrid vehicle engine shutdown. An engine is powered while a clutch interposed between the engine and a machine is disengaged. The engine is unpowered while the clutch remains disengaged. The machine is powered and the clutch controlled to transfer torque from the rotating machine to the unpowered engine to control deceleration of the unpowered engine while decreasing rotation of the machine.

An advantage of an embodiment is that noise, vibration, and harshness are reduced during the engine shutdown routine. This improves the driving experience for the vehicle driver.

DETAILED DESCRIPTION

Figure 1:
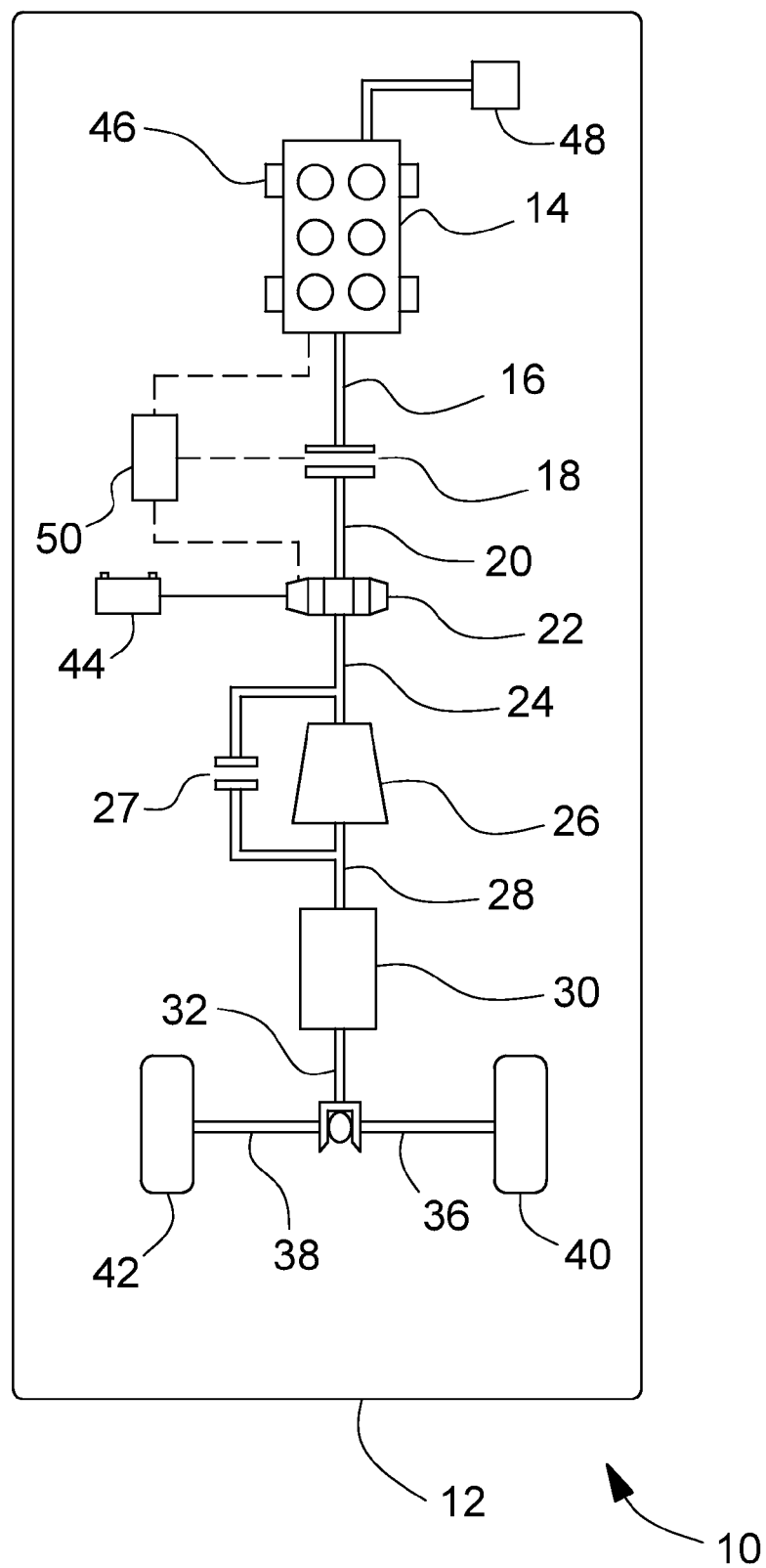
FIG. 1 is a schematic view of a hybrid electric powertrain.

FIG. 1 schematically illustrates a hybrid electric powertrain 10 for an automotive vehicle 12. The powertrain 10 shown in FIG. 1 is exemplary and may be employed with front wheel drive, rear wheel drive, and all wheel drive vehicles.

The powertrain 10 includes an internal combustion engine 14 powering a crankshaft 16. Interposed between the engine 14 and an electric machine 22, which may be an electric motor or motor/generator, is a clutch 18. When engaged, the clutch 18 connects the crankshaft 16 with an electric machine input 20 and transmits torque between the engine 14 and the machine 22. In turn, the machine 22 transmits torque to a torque converter 26 through a torque converter input 24 and the torque converter 26 transmits torque to a transmission 30 through a transmission input 28. There is a bypass clutch 27 that may be used to lock the torque converter 26. The transmission 30 turns a driveshaft 32 which in turn drives a differential 34. The differential 34 transmits torque to first and second axles 36 and 38, respectively, which drive first and second wheels 40 and 42, respectively. The machine 22 is electrically connected to a battery 44. The engine 14 is secured to the vehicle 12 by a plurality of engine mounts 46. Fuel is supplied to the engine 14 by a fuel supply 48. The engine 14, clutch 18, and machine 22 may be controlled by one or more controllers 50. The controller 50 may be comprised of various combinations of hardware and software as is known to those skilled in the art.

Figure 2:
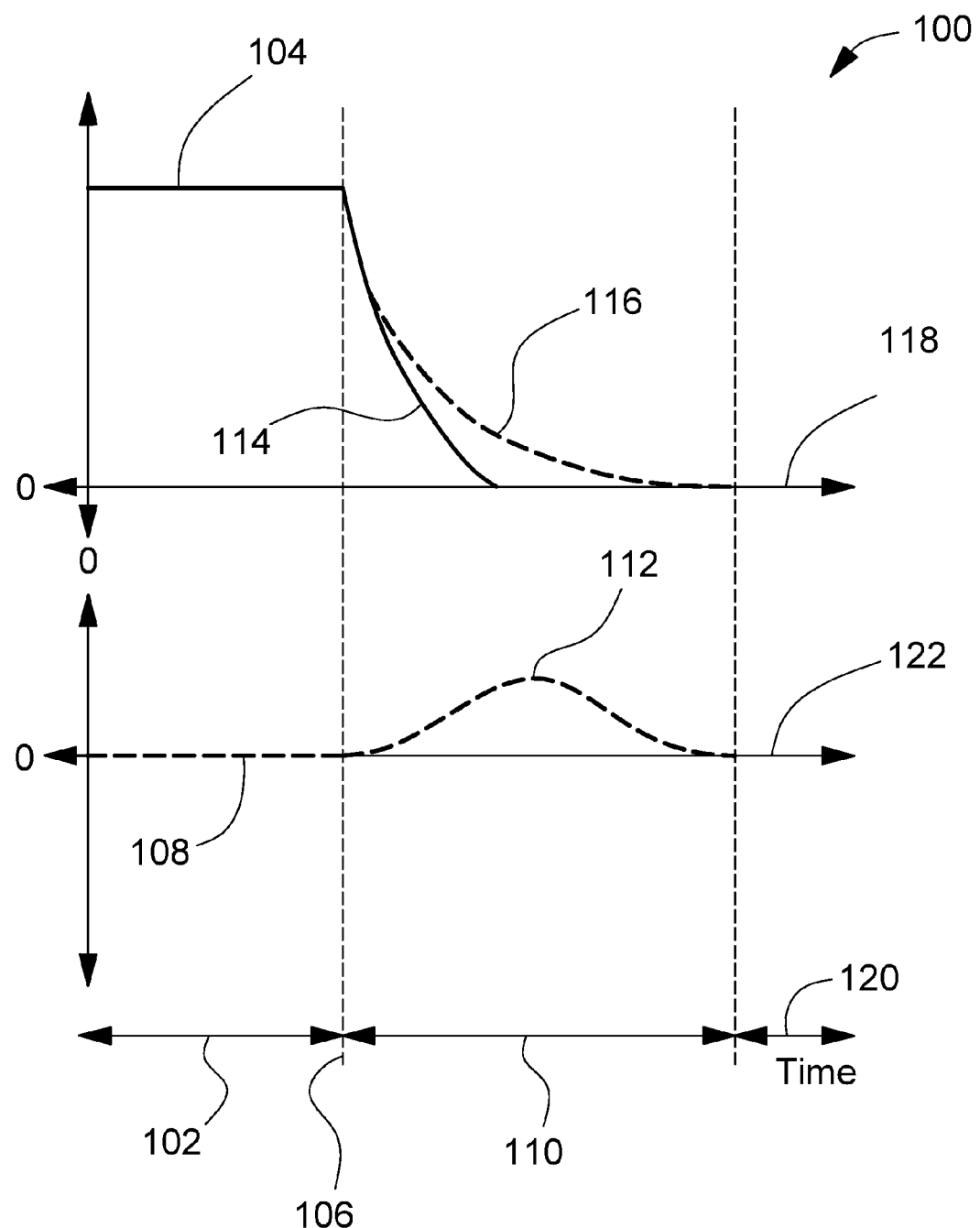
FIG. 2 is a graph of engine speed and clutch torque during an engine shutdown routine.

FIG. 2 will now be discussed with reference to FIG. 1. FIG. 2 graphically illustrates a speed of the engine 14 and a torque load of the clutch 18 during an engine shutdown routine 100 for the internal combustion engine 14. Typically, the engine shutdown routine 100 is used when the powertrain 10 is powering the first and second wheels 40 and 42.

During a time period 102, the engine 14 is powered and rotating at an idle speed 104 and the clutch 18 is disengaged. While the engine 14 is at the idle speed 104, the clutch 18 carries a zero torque 108. At a time point 106, the engine 14 is unpowered by terminating the fuel supply 48 for the engine 14.

During a time period 110, the clutch 18 is controlled to transfer torque between the unpowered engine 14 and the rotating machine 22 to transfer a torque 112 from the machine 22 to the engine 14. As used herein, the term controlling the clutch means controlling the amount of slippage, and hence torque, transferred through the clutch. The torque 112 controls a deceleration of the engine 14 by altering a natural deceleration rate 114 (with the clutch disengaged) to a controlled deceleration rate 116. The natural deceleration rate 114 is the rate at which rotation of the unpowered engine 14 slows to a stop once the engine 14 is unpowered and rotation of the engine 14 is slowing due to friction loss only when the clutch 18 is disengaged. The more torque 112 transmitted from the machine 22 to the engine 14, the slower the engine 14 will decelerate. As illustrated, the controlled deceleration rate 116 is less than the natural deceleration rate 114. Transferring torque from the machine 22 to the engine 14 extends a duration of the engine shutdown routine 100 and reduces torque transferred from the engine 14 through the engine mounts 46 to the vehicle 12. Alternatively, the clutch 18 may disengage prior to the engine 14 reaching a stopped speed 118. Upon disengagement of the clutch 18, the engine 14 returns to decelerating at the natural rate 114.

During a time period 120, the shutdown routine 100 is complete. The engine 14 has slowed to the stopped speed 118. While the engine 14 is at the stopped speed 118, the clutch 18 is at a zero torque 122.

Figure 3:
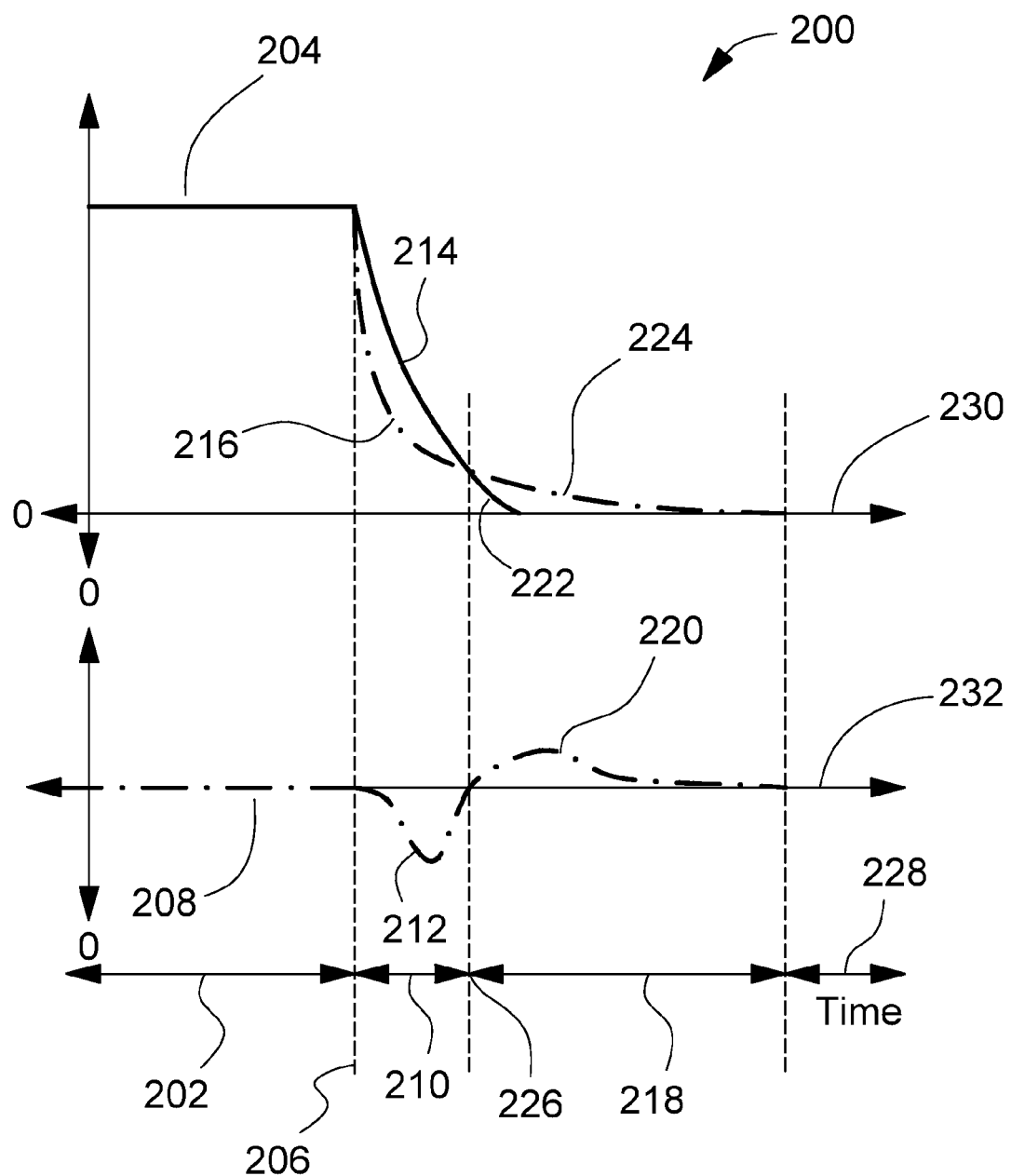
FIG. 3 is a graph of engine speed and clutch torque during an engine shutdown routine.

FIG. 3 will now be discussed with reference to FIG. 1. FIG. 3 graphically illustrates a speed of the engine 14 and a torque load of the clutch 18 during an engine shutdown routine 200 for the internal combustion engine 14. The engine shutdown routine 200 is used when, at initiation of the shutdown routine 200, the speed of the engine 14 is greater than a speed of the machine 22. Typically, the engine shutdown routine 200 is used when the powertrain 10 is not powering the first and second wheels 40 and 42.

During a time period 202, the engine 14 is powered and rotating at an idle speed 204, the machine 22 is unpowered and non-rotating, and the clutch 18 is disengaged. While the engine 14 is at the idle speed 204, the clutch 18 carries a zero torque 208. At a time point 206, the engine 14 is unpowered by terminating the fuel supply 48.

During a time period 210, the clutch 18 is controlled to transfer torque between the unpowered engine 14 and the non-rotating machine 22 to transfer a first torque 212 from the engine 14 to the machine 22. The torque 212 controls a first deceleration of the engine 14 by altering a first natural deceleration rate 214 (with the clutch remaining disengaged) to a first controlled deceleration rate 216. The more torque 112 transmitted from the engine 14 to the machine 22, the faster the engine 14 will decelerate. As illustrated, the controlled deceleration rate 216 is greater than the natural deceleration rate 214. The transfer of torque 212 to the machine 22 produces an electric current stored in the battery 44. The first controlled deceleration rate 216 passes the engine 14 more quickly through a resonance frequency than the first natural deceleration rate 214.

During a time period 218, the clutch 18 remains controlled to transfer torque when the machine 22 is powered to transfer a second torque 220 from the machine 22 to the engine 14. The torque 220 controls a second deceleration of the engine 14 by altering a second natural deceleration rate 222 to a second controlled deceleration rate 224. The more torque 220 transmitted from the machine 22 to the engine 14, the slower the engine 14 will decelerate. As illustrated, the second controlled deceleration rate 224 is less than the second natural deceleration rate 222. Transferring the torque 220 from the machine 22 to the engine 14, in accordance with the shutdown routine 200, extends a duration of the engine shutdown and reduces the torque transferred from the engine 14 through the engine mounts 46 to the vehicle 12. Alternatively, the clutch 18 may disengage prior to the engine 14 reaching a stopped speed 230. Upon disengagement of the clutch 18, the engine 14 returns to decelerating at the natural rate 222.

A time point 226 is the transition between the time period 210 to the time period 218. At the time point 226, the machine 22 changes from receiving the first torque 212 to transmitting the second torque 220. At the time point 226, neither the engine 14 nor the machine 22 are non-rotating. The time point 226 may be when a rotational speed of the engine 14 equals a rotational speed of the machine 22. Alternatively, the time point 226 may be when the rotational speed of the engine 14 is within a predetermined range of the rotational speed of the machine 22. For example, the predetermined range can be a range of speeds known to one skilled in the art at which the clutch 18 may be engaged without damage to the powertrain 10, including the engine 14 and the machine 22. By applying both the first torque 212 and the second torque 220, the time period 218 may be less than the time period 110 when the idle speed 104 and the idle speed 204 are equal.

At a time period 228, the shutdown routine 200 is complete and the engine 14 has slowed to the stopped speed 230. While the engine 14 is at the stopped speed 230, the clutch 18 has returned to a zero torque 232.

Figure 4:
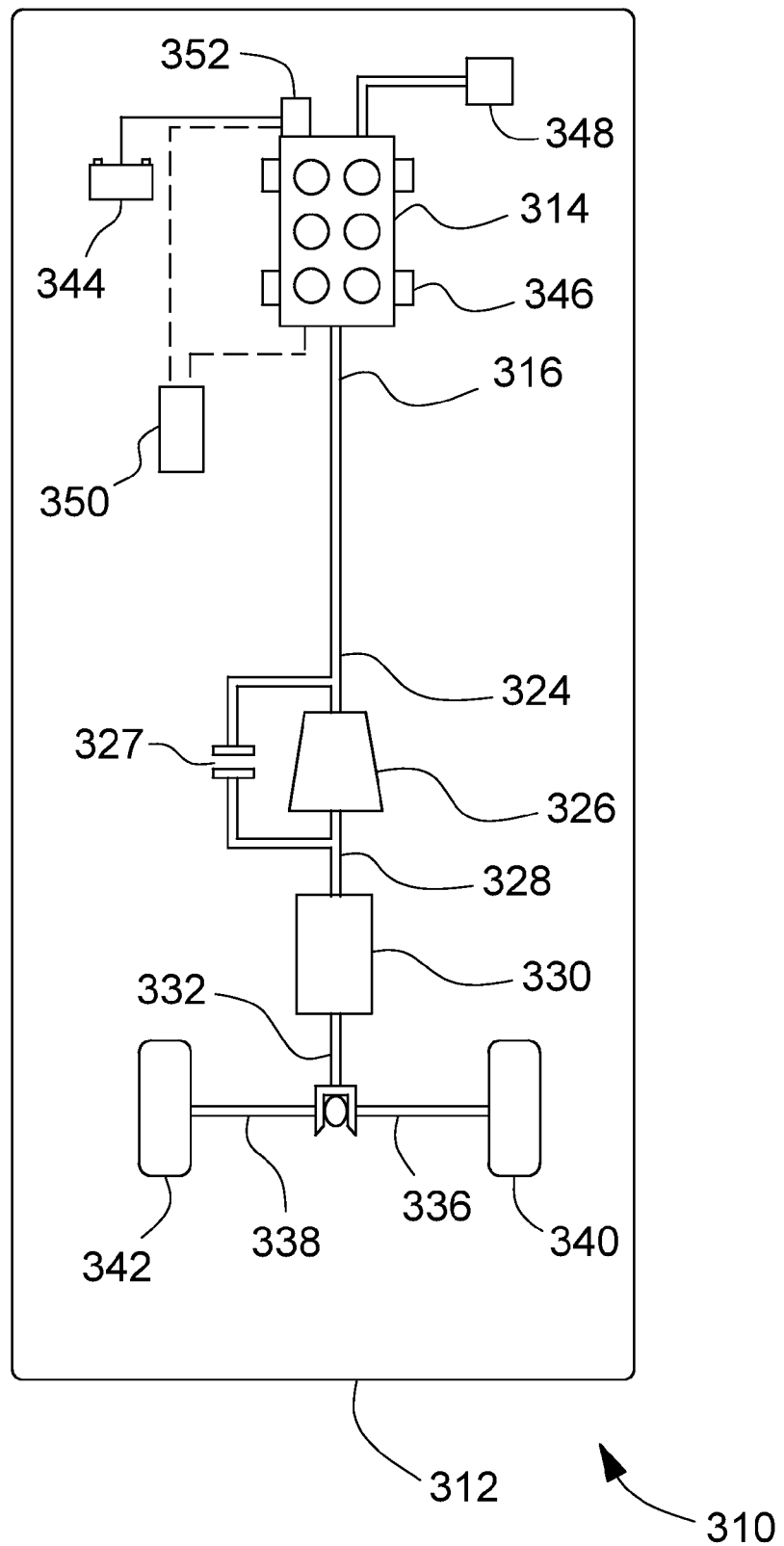
FIG. 4 is a schematic view of a hybrid electric powertrain.

FIG. 4 schematically illustrates a portion of a hybrid electric powertrain 310 for an automotive vehicle 312. Since the powertrain in this embodiment is a modification of the embodiment of FIG. 1, like reference numerals designate corresponding parts in the drawings and detailed description thereof will be omitted. The powertrain 310 shown in FIG. 4 is exemplary and may be employed with front wheel drive, rear wheel drive, and all wheel drive vehicles.

The shutdown routine 200 may also be used with the powertrain 310 including a belted integrated starter generator, in lieu of a machine, to transfer torque to and from the engine 314. The shutdown routine 200 used with the powertrain 310 including the belted integrated starter generator does not require that the powertrain be powering the first and second wheels 340 and 342.

While certain embodiments of the present invention have been described in detail, those familiar with the art to which this invention relates will recognize various alternative designs and embodiments for practicing the invention as defined by the following claims.

What is claimed is:

1. A method of smoothing hybrid vehicle engine shutdown comprising:
   powering an engine and rotating an electric machine while a clutch between the engine and machine is disengaged;
   unpowering the engine while the machine remains rotating with the clutch disengaged;
   controlling deceleration of the unpowered engine by controlling the clutch to transfer torque from the rotating machine to the unpowered engine and decreasing rotation of the machine.

2. The method of claim 1 wherein rotation of the machine is decreased more slowly than a natural deceleration rate of the engine.

3. The method of claim 1 wherein rotation of the powered machine is decreased to zero while the clutch is transferring torque from the machine to the unpowered engine.

4. The method of claim 1 wherein, after a period of transferring torque from the rotating machine to the unpowered engine to decelerate the engine, the clutch is disengaged prior to the engine completely stopping rotation.

5. The method of claim 1 wherein the machine is an electric motor.

6. The method of claim 1 wherein the machine is a belted integrated starter generator.

7. The method of claim 1 wherein, before unpowering the engine, the engine is slowed to an idle speed.

8. A method of smoothing hybrid vehicle engine shutdown comprising:
   powering and rotating an engine while a clutch between the engine and an unpowered, electric machine is disengaged;
   while the engine is powered and rotating, and the machine unpowered, unpowering the engine;
   rotating the unpowered machine by controlling the clutch to transfer torque from the unpowered and rotating engine to the machine;
   when rotation of the engine and machine are each non-zero and within a predetermined speed range, powering the rotating machine; and
   controlling deceleration of the unpowered engine by decreasing rotation of the powered and rotating machine and controlling the clutch to transfer torque from the powered and rotating machine to the unpowered engine.

9. The method of claim 8 wherein rotation of the powered machine is decreased more slowly than a natural deceleration rate of the engine.

10. The method of claim 8 wherein rotation of the powered machine is decreased to zero while the clutch is controlled to transfer torque from the machine to the unpowered engine.

11. The method of claim 8 wherein, after a period of transferring torque from the rotating machine to the unpowered engine to decelerate the engine, the clutch is disengaged prior to the engine completely stopping rotation.

12. The method of claim 8 wherein the machine is an electric motor.

13. The method of claim 12 wherein transferring torque from the engine to the machine generates an electrical current stored in a battery.

14. The method of claim 8 wherein, during transfer of torque from the unpowered engine to the unpowered machine, the engine is rotating at a greater speed than the machine at a time when the clutch is initially controlled to transfer torque.

15. The method of claim 14 wherein the machine is an electric motor.

16. The method of claim 8 wherein the machine is a belted integrated starter generator.

17. The method of claim 8 wherein, before unpowering the engine, the engine is slowed to idle speed.

18. A method of smoothing hybrid vehicle engine shutdown comprising:
    powering an engine while a clutch interposed between the engine and a machine is disengaged;
    unpowering the engine while the clutch remains disengaged;
    powering the machine and controlling the clutch to transfer torque from the rotating machine to the unpowered engine to control deceleration of the unpowered engine while decreasing rotation of the machine.

19. The method of claim 18 wherein rotation of the powered machine is decreased to zero while the clutch is controlled to transfer torque from the machine to the unpowered engine.

20. The method of claim 18 wherein, after a period of transferring torque from the rotating machine to the unpowered engine to decelerate the engine, the clutch is disengaged prior to the engine completely stopping rotation.

* * * * *